Figure 1:
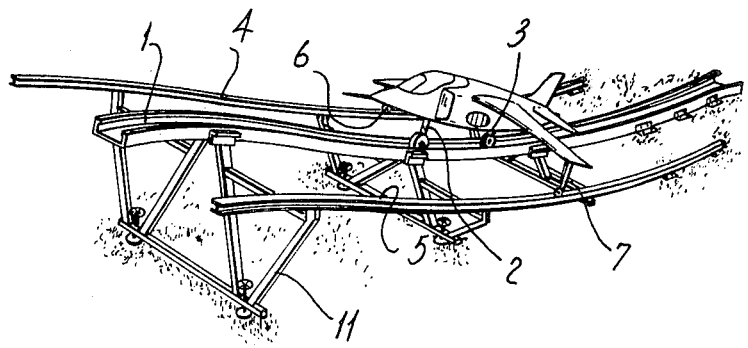

United States Patent [19]

Thomas

[11] 4,350,316
[45] Sep. 21, 1982

[54] RAMP FOR AIRCRAFT TAKE-OFF

[75] Inventor: Ernest D. R. Thomas, Banstead, England

[73] Assignee: British Aerospace, Weybridge, England

[21] Appl. No.: 132,116

[22] Filed: Mar. 20, 1980

[30] Foreign Application Priority Data

Mar. 22, 1979 [GB] United Kingdom ............... 7910092

[51] Int. Cl.³ .............................................. B64F 1/00
[52] U.S. Cl. ................................... 244/63; 244/114 R
[58] Field of Search ................ 244/63, 114 R; 193/38

[56] References Cited

U.S. PATENT DOCUMENTS

| | | | |
|---|---|---|---|
| 1,240,400 | 9/1917 | Zemojtel | 244/114 R |
| 1,706,065 | 3/1929 | Jenkins | 244/63 |
| 1,823,086 | 9/1931 | Charette | 244/114 R |
| 2,100,694 | 11/1937 | Judd | 193/38 |
| 2,939,310 | 6/1960 | Cotton et al. | 244/63 |
| 3,134,300 | 5/1964 | Shlesinger Jr. | 244/63 |
| 3,138,352 | 6/1964 | Saholt | 244/63 |
| 3,954,197 | 5/1976 | Dean | 244/114 R |
| 4,173,323 | 11/1979 | Thorby et al. | 244/114 R |
| 4,252,285 | 2/1981 | Hammond et al. | 244/63 |
| 4,267,991 | 5/1981 | Taylor | 244/63 |

Primary Examiner—Trygve M. Blix
Assistant Examiner—C. T. Bartz
Attorney, Agent, or Firm—Cushman, Darby & Cushman

[57] ABSTRACT

A ramp along which an aircraft having an undercarriage comprising two main units in tandem and two stabilizing units disposed one to each side of the main units travels during take-off, has a primary trackway (1) along which the wheels of the main undercarriage units roll, and secondary trackways (4, 5) along which the wheels of stabilizing units roll, the primary trackway alone having guides (14, 15) which maintain the wheels on the trackways, each trackway comprising a series of discrete members (19, 35) hinged one to the other in end-to-end relationship.

2 Claims, 16 Drawing Figures

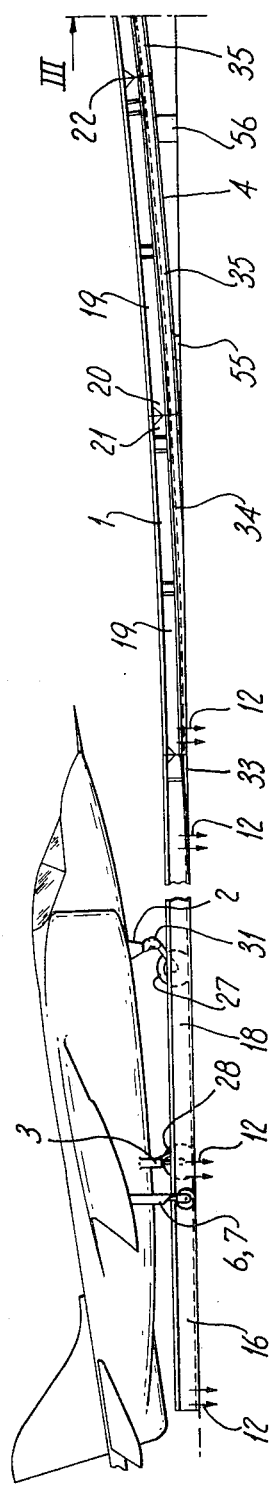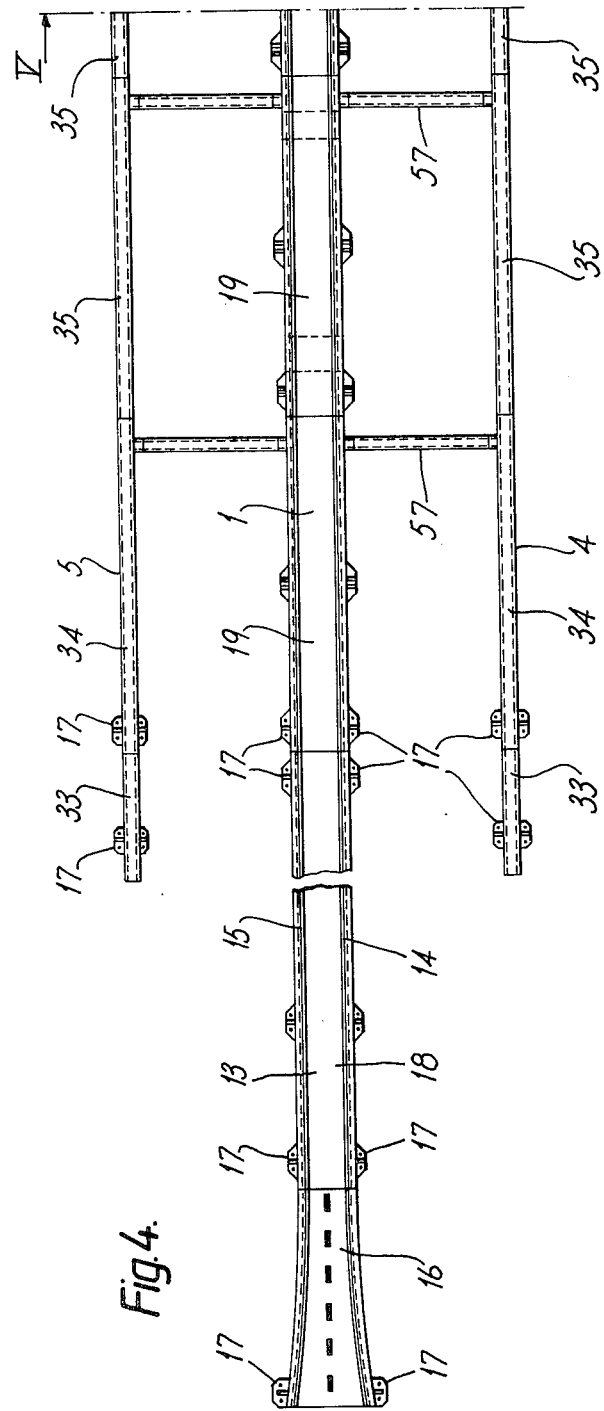

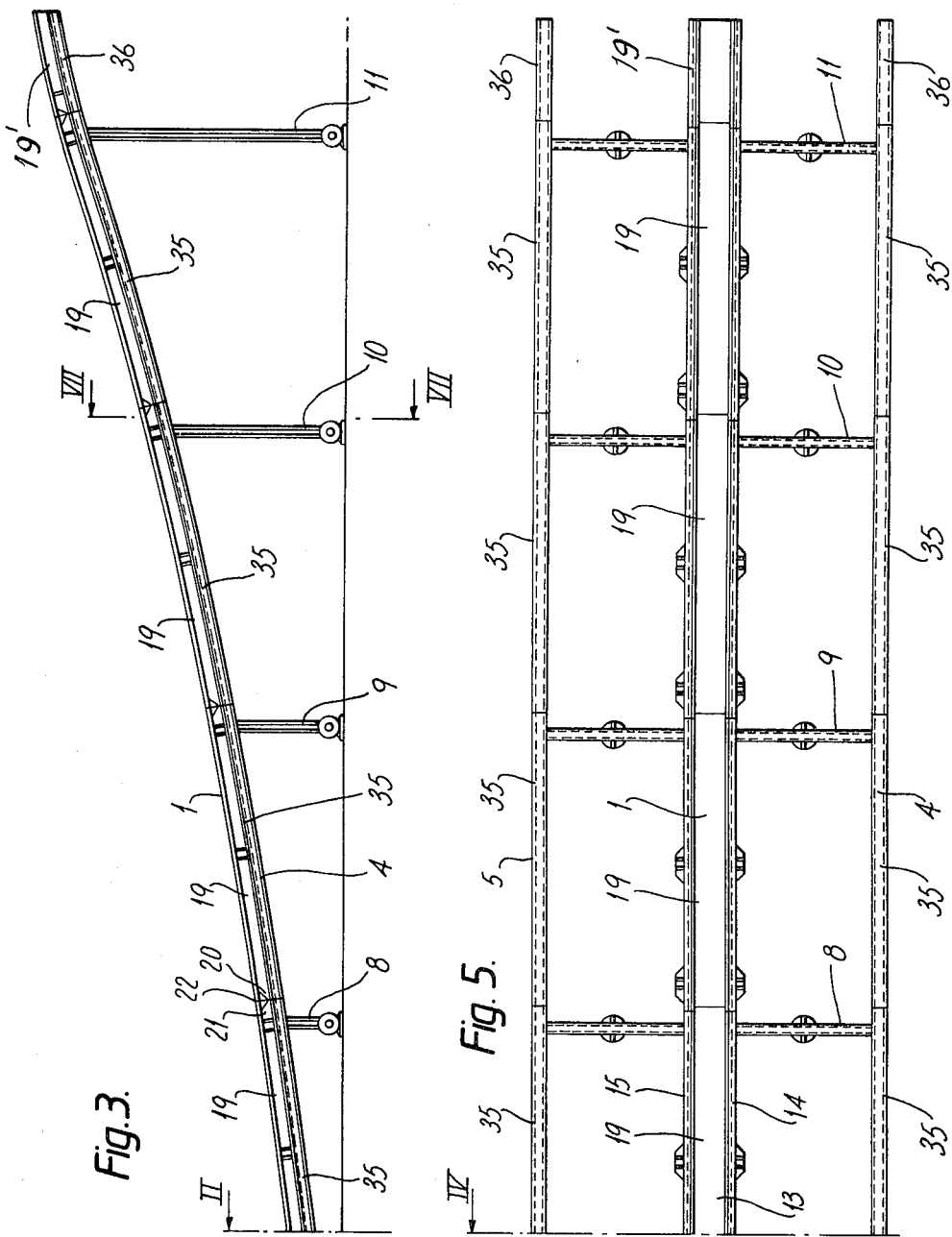

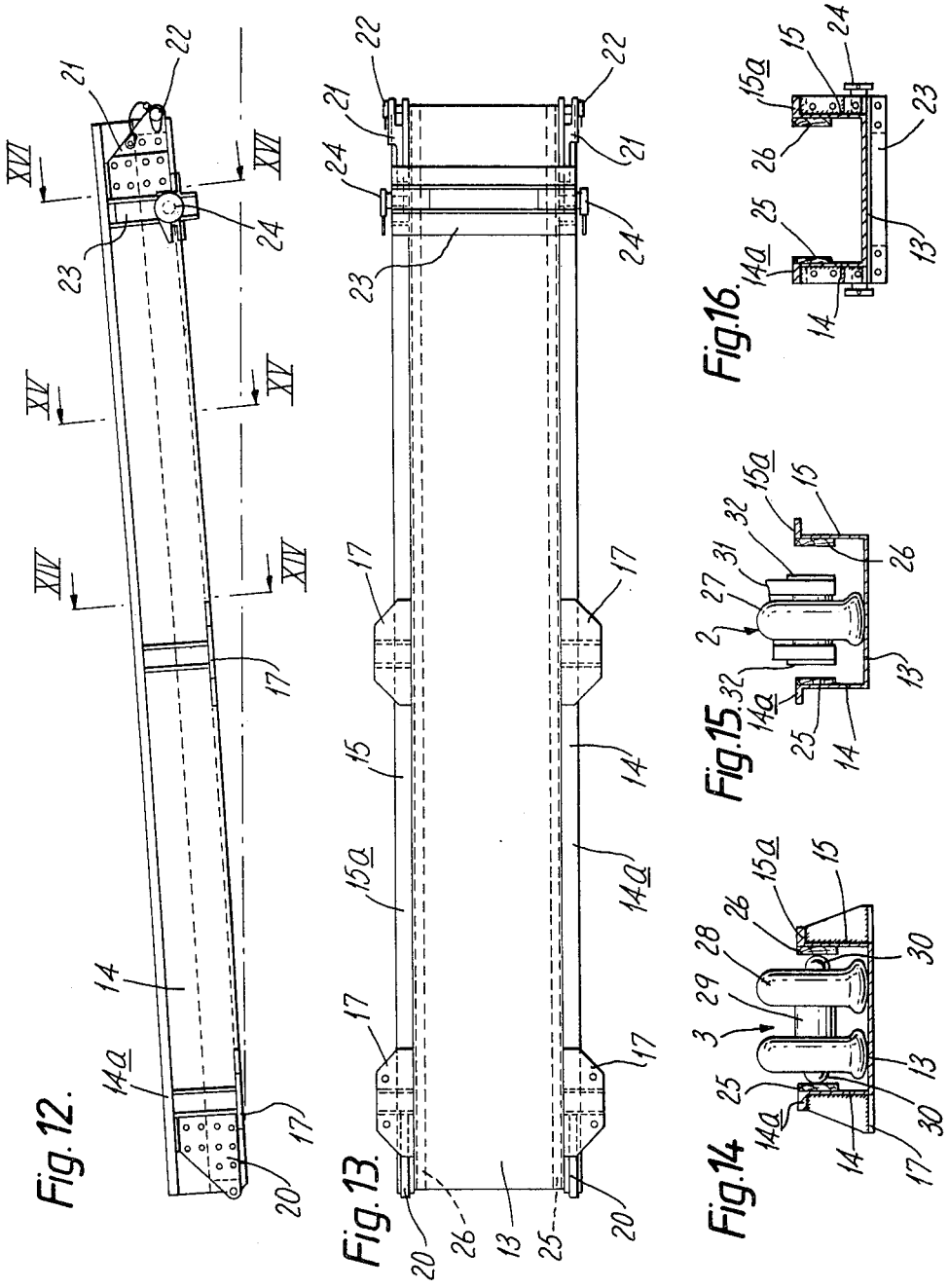

RAMP FOR AIRCRAFT TAKE-OFF

This invention relates to ramps along which an aircraft travels during take-off to achieve an initially ballistic trajectory during which the change to wing borne flight can be made.

Such ramp have particular but not totally exclusive utility when used by aircraft having the ability to deflect their propulsive thrust downward or partly downward; in this case the period of ballistic trajectory is extended by such thrust deflection yielding a relatively long period in which the aircraft can be accelerated to wing borne flight speed. Such ramps enable an aircraft using them to carry additional payload or, alternatively, the take-off distance can be reduced for the same payload.

Take-off ramps naturally have utility in a battle environment both on land or sea. On both, this utility is improved if the ramp is of small area to minimise exposure to battle damage, and especially if any damaged components can be readily repaired or replaced. Furthermore, on both land or sea clearly its exposure to battle damage is reduced if it can be lowered to present a reduced profile. Moreover, the reduced profile yields less interference with defensive armament and radar especially at sea.

In the tactical sense on land, the utility of such a ramp is improved yet further if it is readily handled during transport and during raising or lowering.

According to the present invention a ramp along which an aircraft having a wheeled undercarriage travels during take-off includes a plurality of laterally spaced parallel trackways upon which the wheels of the undercarriage roll, and support means arranged both to support the trackways at a desired acclivity and to maintain their lateral spacing, at least one trackway having guide means which guide the undercarriage so that the wheels are prevented from deviating off the trackways.

Where the aircraft using the ramp has its undercarriage in the form of main undercarriage units mounted in tandem and stabilising undercarriage units mounted outboard to each side of the main units, the ramp includes a single primary trackway on which the wheels of the tandem main units roll, and twin secondary trackways spaced one to each side of the primary trackway on which the wheels of the stabilising units roll, the primary trackway alone having the guide means.

In this case the primary trackway is conveniently provided by a base region, and the associated guide means are formed by upstanding side regions, of a channel shaped element.

The primary trackway preferably is much longer than the secondary trackways, and is positioned to be engaged by the wheels of the tandem main undercarriage units well before the secondary trackways are engaged by the wheels of the stabilising undercarriage units; by this arrangement the aircraft is properly aligned at an early stage of take-off.

Irrespective of the number of trackways and their guide means, it is preferable that they are formed in conveniently transportable lengths which may be hinged together.

Preferably, where the ramp is land based and has ground engaging regions, these regions are arranged to be anchored firmly to the ground so the support means can comprise individual units spaced along the length of the trackways with no interconnecting structural members, apart from the trackways and their guide means, between the individual units.

Figure 6:
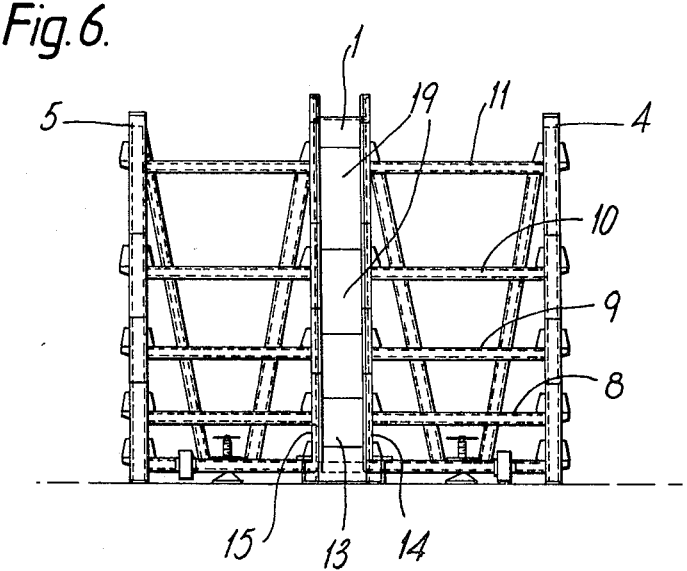
Figure 7:
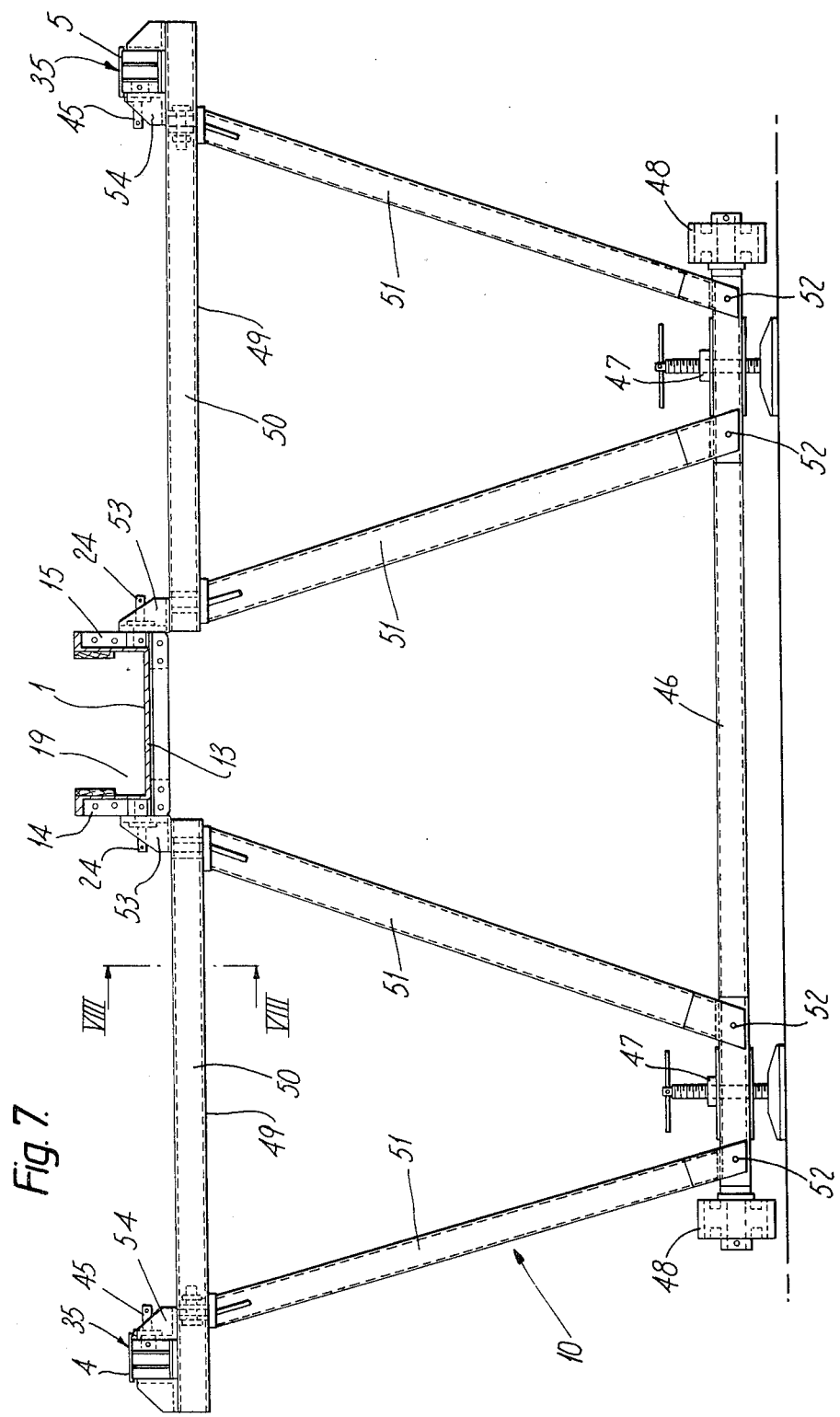
Figure 8:
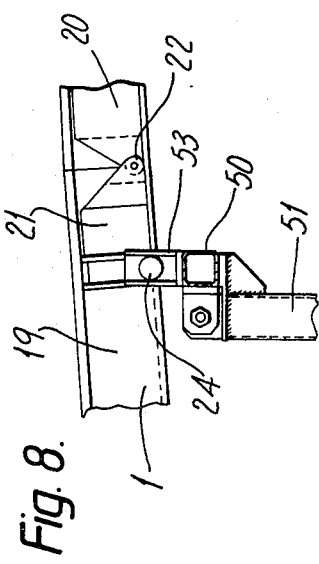
Figure 9:
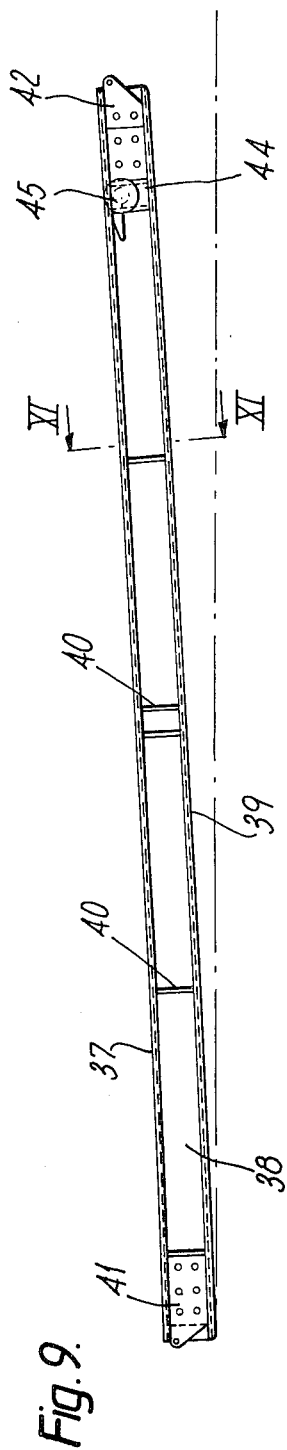

A preferred embodiment of the invention is described with reference to the accompanying drawings, in which:

FIG. 1 is a pictorial view of a ramp with a reduced number of support units shown for clarity, FIGS. 2 and 3 together provide a composite side elevation of a ramp with a preferred number of support units, FIGS. 4 and 5 together provide a composite plan view of the ramp of FIGS. 2 and 3, FIG. 6 is an end elevation, that is to say, a pilot's view of the ramp of FIGS. 2 to 5, FIG. 7 is an enlarged cross-section of the ramp taken upon Arrows VII—VII of FIG. 3, FIG. 8 is a cross-section taken upon Arrows VIII—VIII of FIG. 7, FIGS. 9, 10 and 11 are respectively side, plan, and cross sectional views of a typical secondary trackway unit, the cross section being taken upon Arrows XI—XI of FIG. 9, FIGS. 12 and 13 are respectively side and inverted plan views of a typical primary trackway unit including guide means, and, FIGS. 14, 15 and 16 are cross sectional views, the cross section being respectively taken upon Arrows XIV—XIV, XV—XV and XVI—XVI of FIG. 12.

FIGS. 8 to 16 are to the same scale as FIG. 7.

In the Figures a land based ramp has a primary trackway 1, on which the wheels of tandem main units 2 and 3 of an aircraft undercarriage roll, twin secondary trackways 4 and 5 spaced in parallel one to each side of primary trackway 1, on which the wheels of stabilising units 6 and 7 of the undercarriage roll, and support means, arranged both to support the trackways 1, 4 and 5, at a desired acclivity and to maintain their lateral spacing, the support means comprising a plurality of discrete units 8, 9, 10 and 11. In FIG. 1 only those referenced 8, 10 and 11 are illustrated for simplicity. Anchorage means are provided at the ground engaging regions of the trackways 1, 4 and 5 enabling these regions to be pinned to the ground.

Discussing the various major components in turn, the primary trackway 1 is formed by a base region 13 of an upwardly open channel whilst the guide means which guide the undercarriage are formed by upstanding side regions 14 and 15 of the channel. For ease of handling the channel is formed by a series of discrete primary trackway members joined in end-to-end relationship. The series includes an entrance member 16 which is shaped in plan to aid acquisition of an undercarriage wheel, that is to say, its mouth is much wider than the typical width of the channel. This member 16 has a flat base to lay upon the ground and includes side lugs 17 by means of which it can be anchored to the ground with spikes 12 of known type. The member 16 is connected to a lead-in member 18 with a flat ground engaging base which provides a lead-in to an elevated portion of the trackway 1. Again, the member 18 has side lugs 17 for ground anchorage. The elevated portion of the trackway 1 is formed by five substantially identical curved base primary trackway members 19 which are coupled in end-to-end relationship to continue the series. Terminating the series is a single exit 19' which is cantilevered to the final member 19 to provide an exit region of somewhat less acclivity than that elevated portion immediately preceeding it.

Since the members 19 are substantially identical just one is described by way of example with particular reference to FIGS. 12 to 16. It will be noted that apart from that of the entrance member 16, the undercarriage engaging cross-section of all the primary trackway members 18, 19 and 19' is identical; those members 16, 18, and 19' accordingly do not require special description.

Each member 19, in common with the other primary trackway members, is in the form of an upwardly open channel having the base region 13 and the upstanding side regions 14 and 15 to which reference has already been made. The fact that these regions 13, 14 and 15 form integral parts of a channel ensure that each trackway member is sufficiently strong to form a structural beam. Extra strength is provided by forming the side regions 14 and 15 with outwardly directed flanges 14a and 15a. As is illustrated in the Figures, the channel is formed with a curved base of constant radius so that when the trackway members 19 are coupled together and supported at the desired acclivity, an arc of constant curvature is provided on which the wheels will roll.

Coupling lugs 20 are fixedly attached to the side regions 14 and 15 of one end of each member 19 whilst at the other end coupling lugs 21 are similarly fixedly attached. Those referenced 20 are in the form of single lug on each side region 14 and 15 whilst those referenced 21 are in the form of double lugs on each side region so spaced to accept the single lugs 20 of a further member 19 between them. All the lugs 20 and 21 are apertured to accept transverse, substantially horizontal pivot pins 22 to form a hinged coupling. The pivot 22 pins may be of a known quick release type.

Each member 19 has side lugs 17, both for stiffening purposes and, where apertured at one end, for accepting ground anchorage spikes if that end of the member 19 happens to lie on the ground.

Transverse reinforcement 23 and laterally extending spigots 24 are provided at that end of the member 19 remote from the apertured lug end to provide attachments for support means to be described.

Inwardly facing rubbing strips 25 and 26 are provided on the lips of each side region 14 and 15. All the trackway members include these strips 25 and 26 so that they extend the full length of the ramp.

FIGS. 14 and 15 conveniently show the engagement the channel base 13 and its side regions 14 and 15 by the wheels 27 and 28 respectively of aircraft tandem main undercarriage units 2 and 3. The side members 14 and 15 are of sufficient depth such that the rubbing strips 25 and 26 extend above the axis of rotation of the wheels when rolling upon the trackways. As shown in FIG. 14, the wheels 28 of the unit 3 have an axle 29 having lateral extensions 30 formed to engage the rubbing strips 25 and 26 and to be guided thereby. Also, as shown in FIG. 15, the wheel 27 of the unit 2 has a yoke 31 with protective sheaths 32 formed to engage the rubbing strips 25 and 26 and to be guided thereby. As is apparent, the yoke 31 is appreciably narrower than the channel, but it is found that any oscillation induced as the yoke contacts firstly one rubbing strip and then the other is quite acceptable to the pilot.

The rubbing strips 25 and 26 are of timber.

The twin secondary trackways 4 and 5 are formed by an upper surface of a box beam. For ease of handling the beam is formed by a series of discrete secondary trackway members joined in end-to-end relationship. The series includes, for each identical trackway 4 and 5, an entrance member 33, of wedge shape in side view to enable a wheel to relatively smoothly roll off the ground onto the trackway. The member 33 has side lugs 17 for ground anchorage purposes. It connects to a lead-in member 34, of a tapered shape in side view, which also has side lugs 17. The members 33 and 34 lie upon the ground and therefore have flat base regions. The member 34 is connected to one of five substantially identical curved base secondary trackway members 35 which are coupled in end-to-end relationship to continue the series in a similar manner to that of the trackway 1. Terminating the series for each trackway 4 and 5 a single exit member 26 cantilevered to the final secondary member 35 to provide a similar exit region to that of the primary trackway 1.

Figure 11:
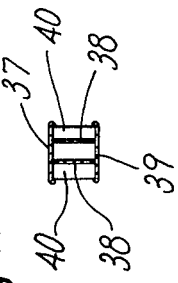
Figure 10:
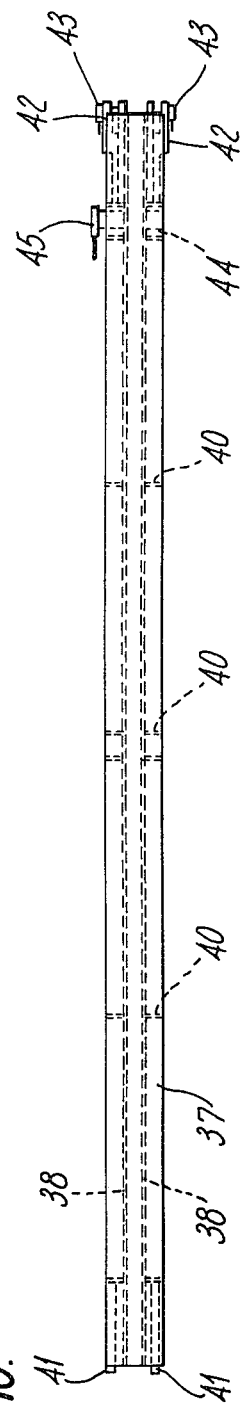

Since the members 35 are substantially identical just one is described by way of example with particular reference to FIGS. 9, 10 and 11. The wheel engaging cross-section of all the secondary trackway members 33, 34, 35 and 36 is identical; those members 33, 34, and 36 accordingly do not require special description.

Each member 35 is in the form of an upper flange 37, providing the surface forming the trackways 4 and 5, which is curved of constant radius so that when the members 35 are coupled together and supported similarly to the primary trackway, a similarly constant curvature is obtained but of somewhat greater radius. The upper flange 37 is supported on twin spaced vertical webs 38, there being a bottom flange 39, so that the resultant structural member is in the general form of an I-section beam. Stiffening webs, extending transversely are provided at 40 between the flanges.

Coupling lugs 41 are fixedly attached to the vertical web 38 of one end of each member 35 whilst at the other end coupling lugs 42 are similarly fixedly attached. Those referenced 41 are in the form of a single lug on each web 38 whilst those referenced 42 are in the form of double lugs on each web 38 so spaced to accept the single lugs 41 of a further member 35 between them. All the lugs 41 and 42 are apertured to accept transverse, substantially horizontal pivot pins 43 to form a hinged coupling. Again the pins 43 may be of a known quick release type.

Transverse reinforcement 44 and laterally extending spigots 45 are provided at one end of each member 35 to provide mounting points for support means to be described.

The support means, as before stated, comprises a plurality of discrete units 8, 9, 10, and 11. They are all of similar design, even though of varying heights to provide the desired acclivity of the trackways, and accordingly only one example (that referenced 10) is described in detail. Referring particularly to FIGS. 7 and 8, the support unit 10 comprises a transverse horizontal bottom tube 46 having vertically adjustable feet 47 just inboard of its ends. These feet may have ground engaging spikes of known design. On each end, a wheel 48 is provided for facilitating handling. Surmounting the bottom tube 46 are twin triangulated structures 49 which lie equally spaced one to each side of the primary trackway 1. These structures each comprise an upper transverse tube 50 with two support tubes 51 arranged in the form of a V extending between the upper tube 50 and the bottom tube 46. The tubes 51 are rigidly connected to the cross tube 50 but are pinned at 52 to the bottom tube with known quick release pins (not shown). The tubes 50 have support brackets 53 at their inboard ends which engage the flanks of the members 19 and their associated spigots 24 and also support brackets 54 at their outboard ends which engage the flanks of the members 35 and their associated spigots 45. It will be noted that the spigots 24 and 45 are co-axially mounted with one another.

Bolsters 55 and 56 are provided to support the trackways prior to the first support unit 8. In this region transverse tubes 57 similar to those referenced 50 are provided to maintain the spacing of the trackways.

The primary trackway 1 and its associated guide means extend well in advance of the secondary trackways 4 and 5. As shown in FIG. 2, the wheels 27 and 28 of the main undercarriage units 2 and 3 become fully engaged in the primary trackway 1, so that the aircraft is accurately aligned for take-off, well before the wheels of the stabilising undercarriage units 6 and 7 encounter the trackways 4 and 5. As illustrated in FIG. 2, the wheels of the units 6 and 7 are still contacting the ground rather than the ramp even though the wheels 27 and 28 are ramp engaged.

To lower the ramp to reduce its profile, and/or to dis-assemble it for transportation, is basically to temporarily support the weight of the ramp in two places along its length by external tackle, and then swing the bottom ends of the support units 8, 9, 10 and 11 about the lugs 24 and 45, gradually lowering the ramp until it is in a ground supported collapsed state, the members 19 and 35 flexing with respect to their adjacent members about their pins 22 and 43 respectively.

To obtain a minimum profile after supporting the weight of the ramp in two places as before, the transverse lower tubes 46 are removed from the triangulated structures 49, so that these can be similarly swung about the spigots to lie on the ground to each side of the primary trackway 1 in between the secondary trackways 4 and 5. Since the transverse upper members 50 are discontinuous and the lower transverse members 46 are removed, the primary trackway can lie closely upon the ground. As the respective members 19 and 35 can flex with respect to one another about their pins 22 and 43, they can readily conform to the ground contour.

Alternatively, the various components can be dis-assembled for dispersal.

As described, the trackways of the erected ramp describe curves which are truly circular arcs. However, in alternative embodiments, the ramps may describe curves which are non-circular, or are an amalgam of arcs of differing radius.

I claim:

1. A ramp along which an aircraft, having a wheeled undercarriage of the type having two main units in tandem and two stabilizing units disposed one to each side of the main units, travels during take-off including:
   a single primary trackway on which the wheels of the main units roll;
   twin secondary trackways spaced one to each side of said primary trackway on which the wheels of the stabilizing units roll; and
   support means arranged to both support said trackways at a desired acclivity and to maintain their lateral spacing, said primary trackway alone having guide means, provided with a wider entrance mouth, which guide the undercarriage so that the wheels are prevented from deviating off the trackways, and being of such a length and so positioned to extend in advance of said secondary trackways so that said primary trackway is engaged by both main units of an aircraft undercarriage well before the stabilizing units engage said secondary trackways to ensure that the aircraft is correctly aligned even at take-off speeds before its undercarriage engages said secondary trackways.

2. A ramp according to claim 1 wherein:
   the trackways each comprise a series of members and pivot means pivoting adjacent members of a series together about horizontal transverse axes;
   the support means comprise discrete support units and pivot means pivoting each support unit to said trackways about horizontal transverse axes; and
   said trackways have ground anchorage means positioned at their ground contacting regions such that longitudinal movement of said trackways is prevented and said discrete support units require no interconnection other than said trackways.

* * * * *